(12) United States Patent
Radley

(10) Patent No.: US 7,332,828 B2
(45) Date of Patent: Feb. 19, 2008

(54) CAUSING OPERATION OF LOAD IN ALTERNATE, REDUCED PEAK POWER MODE

(75) Inventor: Thomas G. Radley, Chula Vista, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 11/807,808

(22) Filed: May 30, 2007

(65) Prior Publication Data
US 2007/0228843 A1    Oct. 4, 2007

Related U.S. Application Data

(62) Division of application No. 10/172,177, filed on Jun. 14, 2002, now Pat. No. 7,227,281.

(51) Int. Cl.
*H02J 1/00* (2006.01)
(52) U.S. Cl. ............................................ 307/4
(58) Field of Classification Search ............... 307/4, 307/130
See application file for complete search history.

*Primary Examiner*—Robert L. Deberadinis

(57) ABSTRACT

A system of one embodiment is disclosed that includes a load, a power supply, and a mechanism. The load is operable in a default mode and an alternate mode. The load has better performance in the default mode than in the alternate mode, and consumes less peak power in the alternate mode than in the default mode. The power supply is connectable to an external power source to provide voltage to at least the load. The mechanism causes the load to operate in the alternate mode upon detecting the voltage provided by the power supply dropping below a predetermined threshold level than a predetermined threshold number of times.

13 Claims, 7 Drawing Sheets

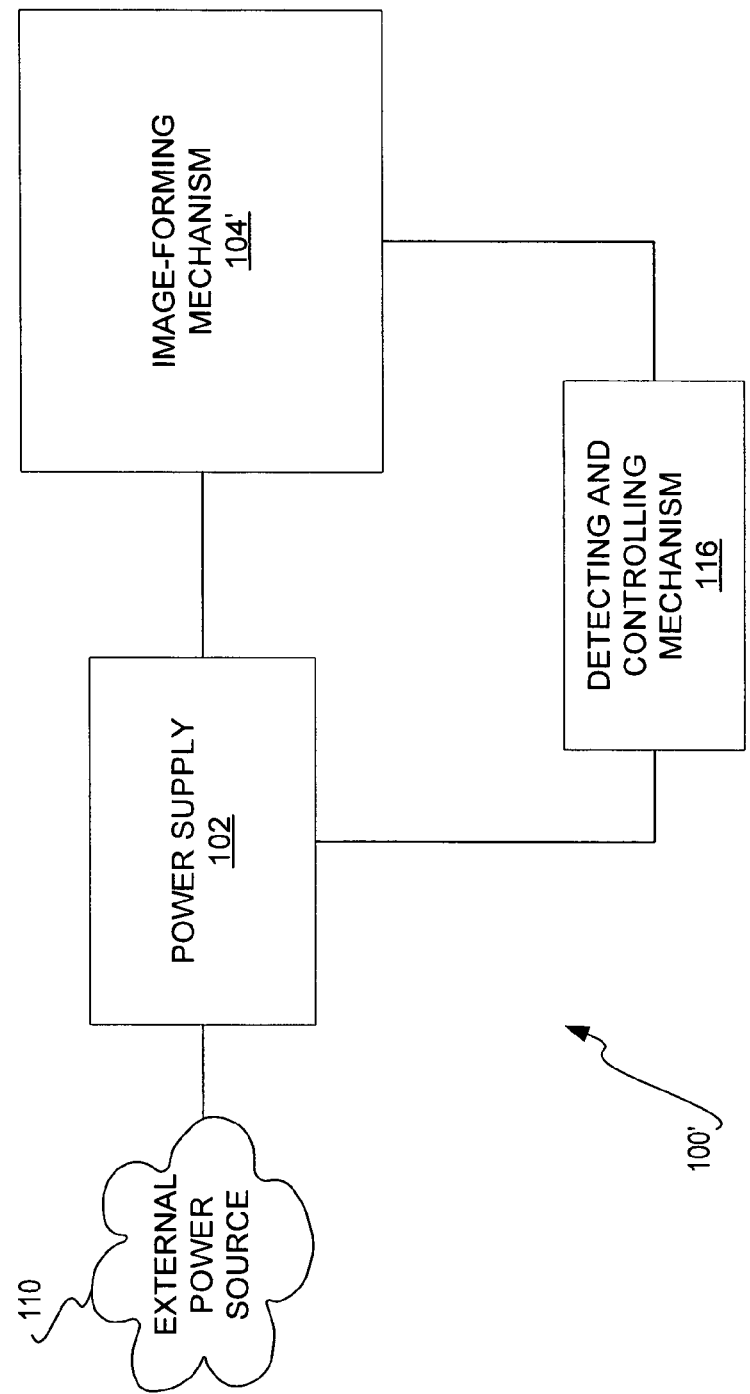

CAUSING OPERATION OF LOAD IN ALTERNATE, REDUCED PEAK POWER MODE

CROSS-REFERENCE TO RELATED APPLICATIONS

This application is a divisional application claiming priority to and the benefit of U.S. patent application having Ser. No. 10/172,177 filed Jun. 14, 2002 now U.S. Pat. No. 7,227,281 and entitled "CAUSING OPERATION OF LOAD IN ALTERNATE, REDUCED PEAK POWER MODE".

BACKGROUND

Image-forming devices, such as inkjet printers, laser printers, facsimile machines, and multifunction devices, typically have one or more mechanisms that consume a relatively large amount of peak power. For example, laser printers and other devices that employ laser-printing mechanisms have heaters that consume a large amount of peak power to fuse toner onto media. As another example, inkjet printers and other devices that employ inkjet-printing mechanisms have motors connected to rollers that consume a large amount of peak power to feed media through them. These devices usually consume this peak power only momentarily, such as when the heaters of laser printers are turned on, or when the rollers of inkjet printers first are accelerated.

In areas where the external power source is unreliable, this momentary large amount of peak power consumption can cause undesired voltage dips. Many devices, upon experiencing voltage dips to a sufficiently low level, will reset. This can be inconvenient and frustrating to the users of these devices. They may have to restart print jobs, for example. More seriously, saved settings and data, such as saved faxes in the case of devices having facsimile capability, may be lost. Currently incoming or outgoing faxes may prematurely terminate. The reliability of these devices can be improved by reducing the susceptibility of these devices to dips in supply voltages.

SUMMARY OF THE INVENTION

A system of one embodiment of the invention includes a load, a power supply, and a mechanism. The load is operable in a default mode and an alternate mode. The load has better performance in the default mode than in the alternate mode, and consumes less peak power in the alternate mode than in the default mode. The power supply is connectable to an external power source to provide voltage to at least the load. The mechanism causes the load to operate in the alternate mode upon detecting the power provided by the power supply dropping below a predetermined threshold level more than a predetermined threshold number of times.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG; 2 is a graph showing the levels over which voltage being supplied to a load can fluctuate, according to an embodiment of the invention.

Figure 1:
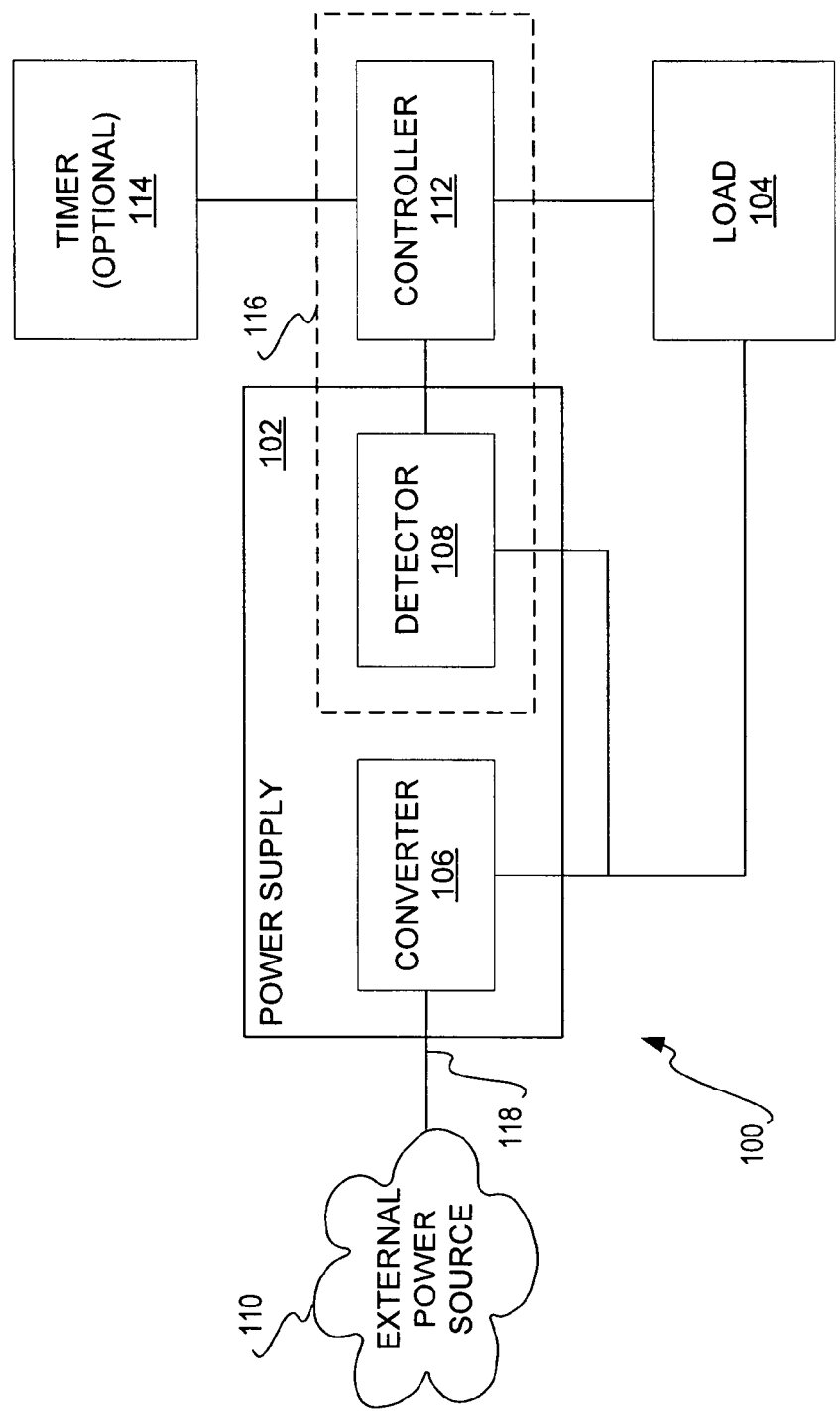
FIG. 1 is a block diagram of a system according to an embodiment of the invention.
Figure 3:
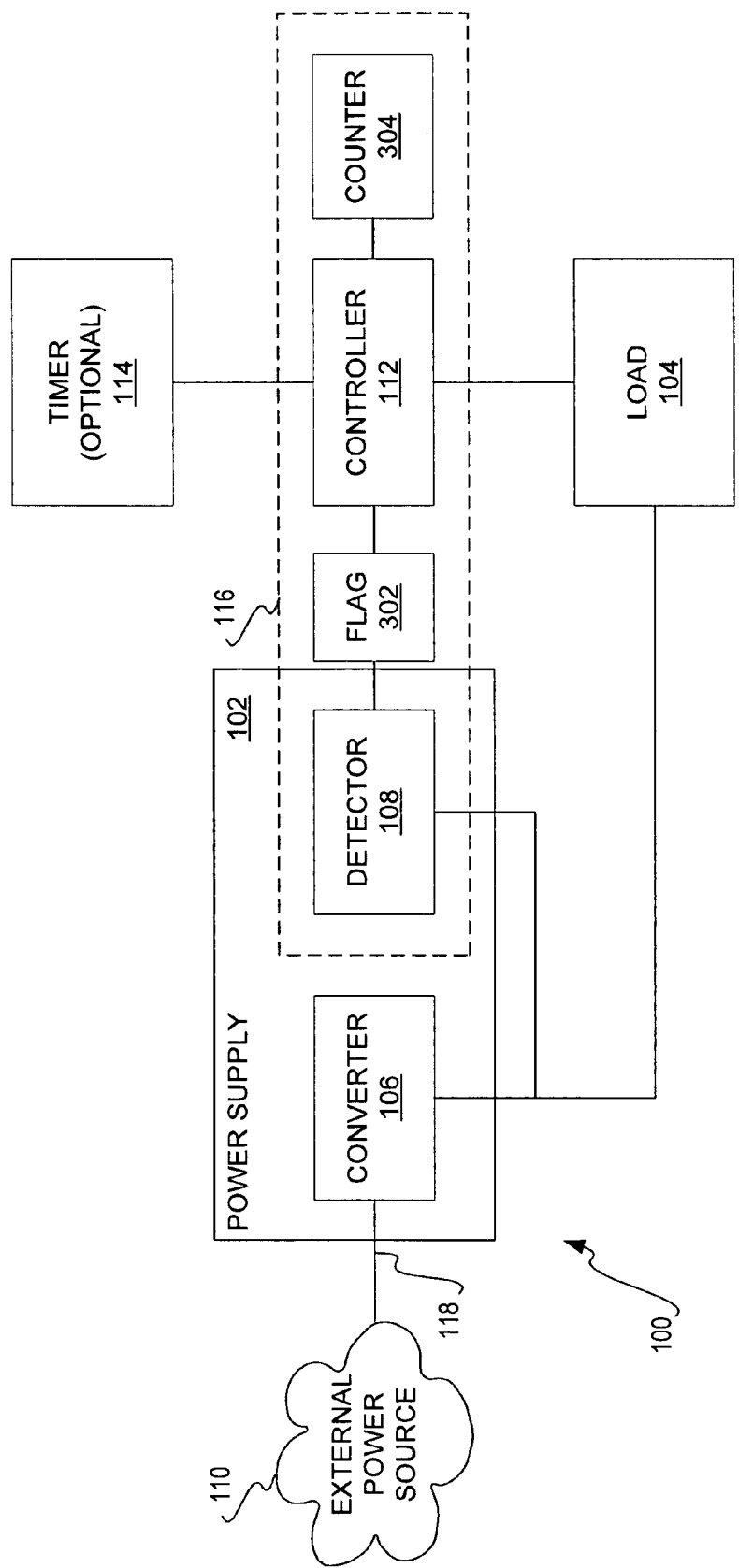

FIG. 3 is a block diagram of a system according to another embodiment of the invention that is more detailed than but is consistent with the system of FIG. 1.

Figure 2:
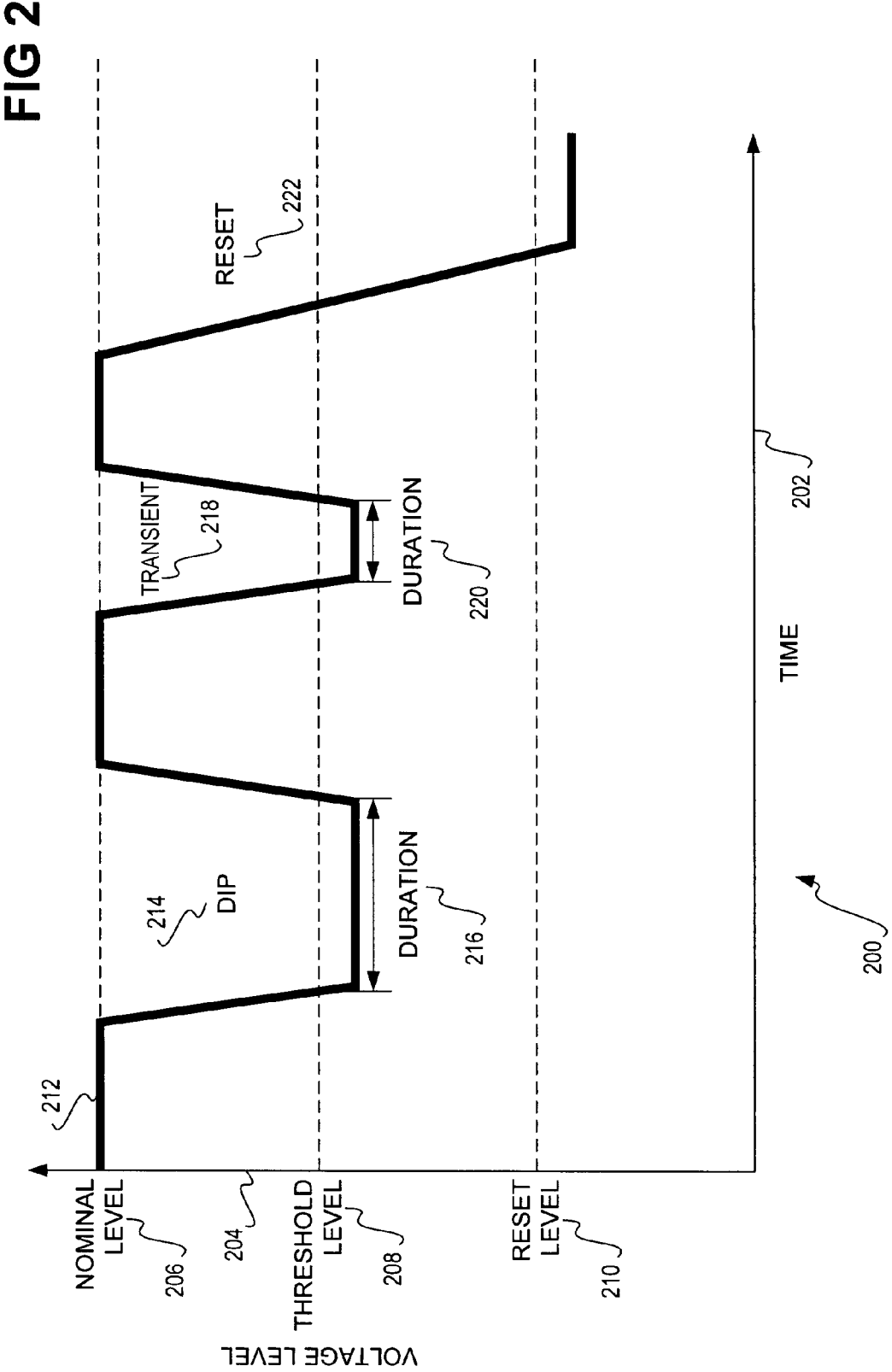
Figure 4:
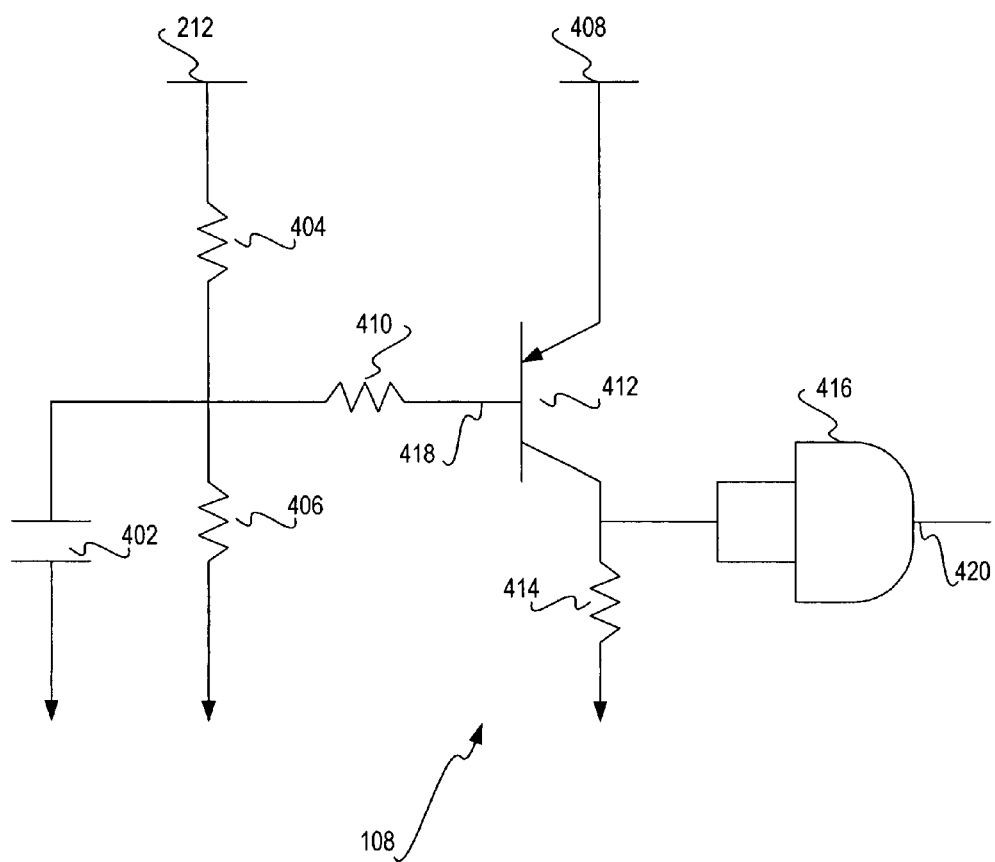

FIG. 4 is an electrical schematic of a circuit that can implement the detector of the systems of FIGS. 1 and 2 in one embodiment of the invention.

Figure 5:
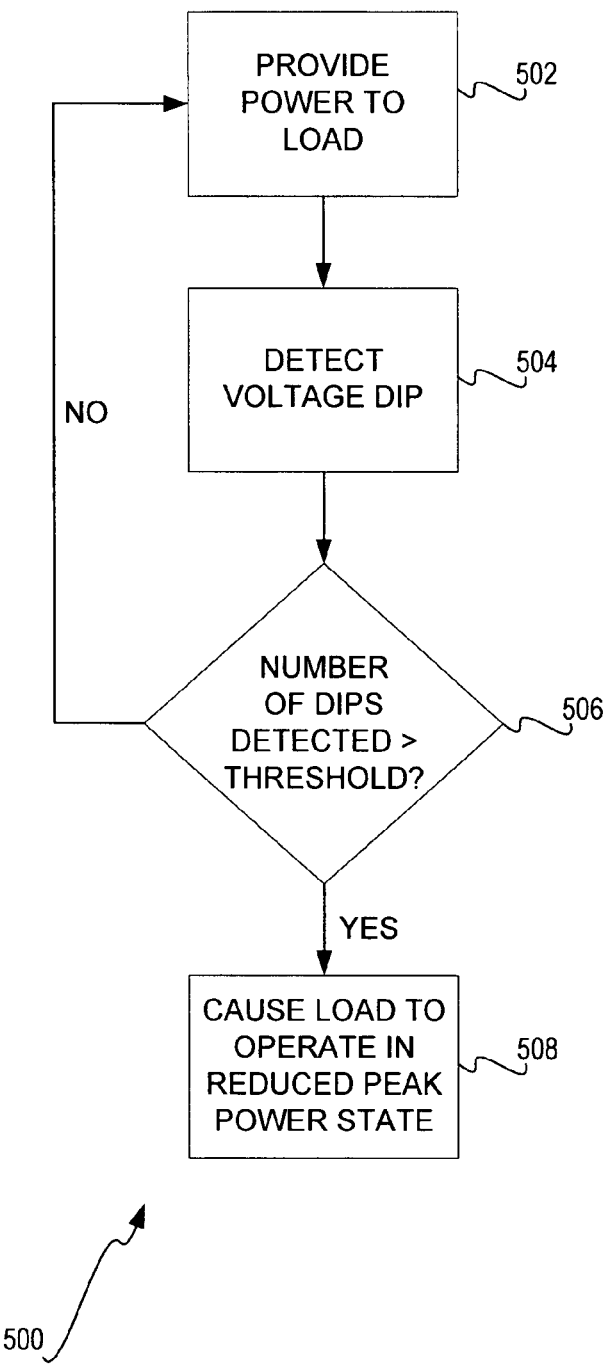

FIG. 5 is a flowchart of a method according to an embodiment of the invention.

Figure 6:
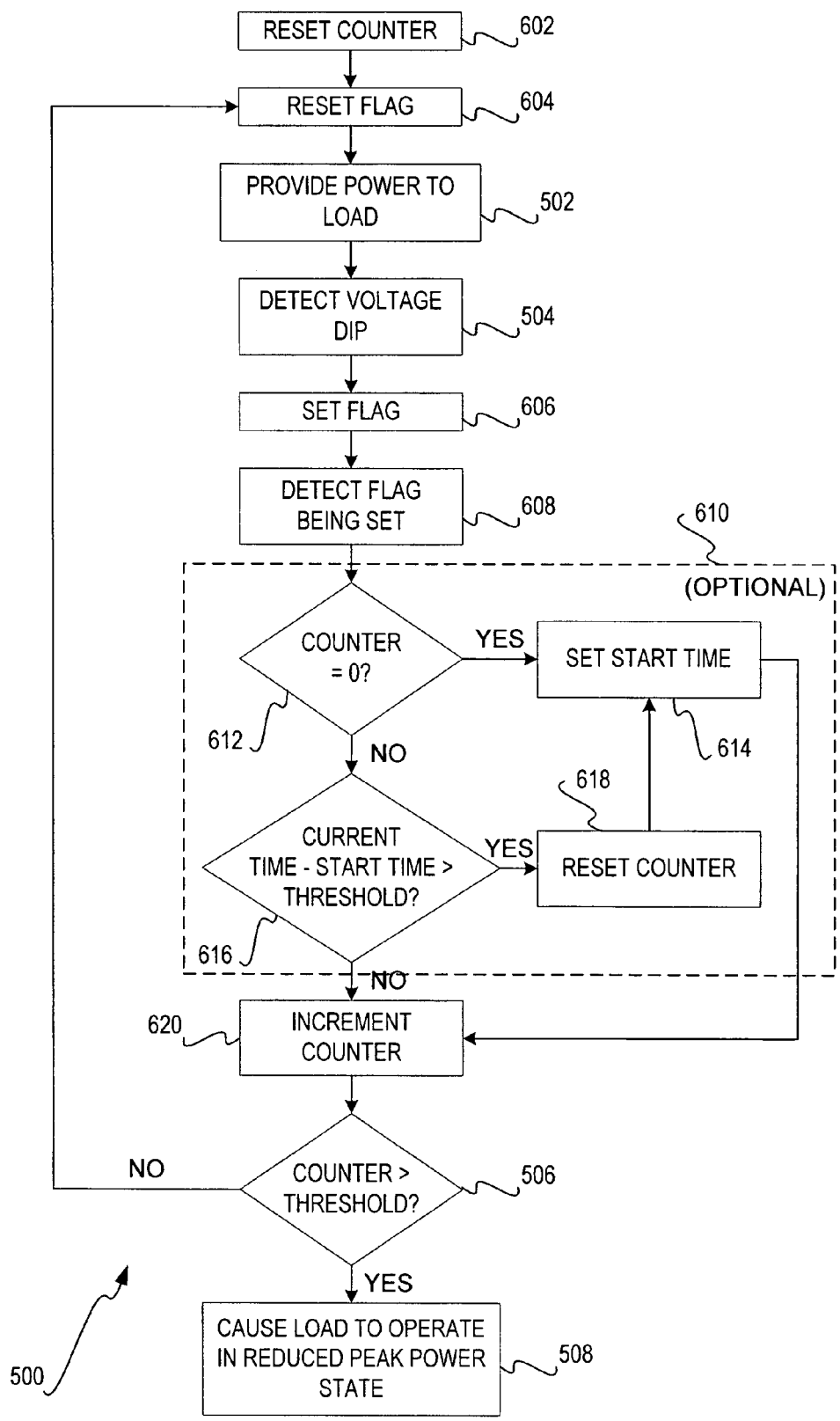

FIG. 6 is a flowchart of a method according to another embodiment of the invention that is more detailed than but is consistent with the method of FIG. 5.

FIG. 7 is a block diagram of an image-forming device according to an embodiment of the invention that is consistent with the systems of FIGS. 1 and 3.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. For instance, whereas embodiments of the invention are substantially described in relation to a system having a load, it is applicable to all such systems, including image-forming devices like printers, facsimile machines, multifunction devices, and so on. The following detailed description is, therefore, not to be taken in a limiting sense, and the scope of the present invention is defined only by the appended claims.

Systems

FIG. 1 shows a system 100 according to an embodiment of the invention. The system 100 includes a power supply 102 that provides voltage to a high peak current load 104. The power supply 102 preferably includes a converter 106, such as a transformer, that converts voltage received from an external power source 110 to which it is connected via a connector 118, to the voltage that is supplied to the load 104. The external power source 110 may be an alternating current (AC) or a direct current (DC) source. As an example of the former, the external power source 110 may be a power line grid to which a building is connected, where the building has a number of outlets. The connector 118 may thus be a cable ending in a plug for insertion into one of these outlets.

The high peak current load 104 typically consumes momentarily a large amount of power. Where the system 100 is an image-forming device, such as a printer, a facsimile machine, or a multifunction device, and so on, the load 104 may include the rollers that move media through the device. The rollers may have a high degree of inertial friction that momentarily requires a large amount of peak power supplied to their motors to overcome. The load 104 may also include a heater in the case where the device includes a laser printing mechanism, to fuse toner to the media or an inkjet printing mechanism that may use a heater for paper pre-conditioning. When the heater is first turned, it may momentarily require a large amount of peak power.

The load 104 is preferably operable in one of two modes. In a default mode, the load 104 has better performance than in the alternate mode. However, in the alternate mode, also generally referred to as a reduced peak power state, the load 104 consumes less peak power than in the default mode. The load 104 by design operates in the default mode. In the case of an image-forming device, for instance, the load 104 may operate in the default mode to provide a rated level of performance, such as a number of pages per minute (PPM) that can be printed by the device. In this default mode, the load 104 consumes a certain amount of peak power. However, where the voltage supplied by the external power source 110 is sufficiently irregular, and/or where the peak power consumed by the load 104 is sufficiently great in terms of amount or consumption duration, the voltage supplied by the power supply 102 to the load 104 may dip.

Therefore, the load 104 preferably includes an alternate mode to which operation thereof can revert or fallback. Preferably, the load 104 in this alternate mode consumes less peak power than in the default mode, but may also operates at a lower performance level. In the case of an image-forming device, for instance, the load 104 when operating in the alternate mode may provide a lower level of performance, such as a lower number of PPM that can be printed by the device, so that a lower amount of peak power is needed due to lower acceleration. The rollers of an inkjet-printing mechanism, for example, may not start as quickly, or the heater for a laser-printing mechanism may not heat up as quickly. Preferably, operation of the load 104 in this alternate mode causes the voltage provided by the power supply 102 to dip less often below the threshold, and/or to have dips of lower magnitudes.

The system 100 includes a mechanism 116 to monitor the voltage provided by the power supply 102 to the load 104, and cause the load 104 to operate in the alternate mode instead of in the default mode when a predetermined number of voltage dips occur. A voltage dip is defined as the voltage provided by the power supply 102 to the load 104 dropping below a predetermined threshold level. The mechanism 116 includes a detector 108 and a controller 112. The detector 108 may include a circuit, whereas the controller 112 may include firmware and memory. The detector 108 detects when the voltage provided by the power supply 102 dips. The controller 112 counts the number of times the detector 108 detects these voltage dips, and causes the load 104 to operate in its alternate mode when it has counted a great enough number of voltage dips.

Whereas the detector 108 is shown as being implemented within the power supply 102 in FIG. 1, alternatively it may be implemented separate from the power supply 102. Furthermore, the controller 112 may alternatively also track the number of voltage dips detected by the detector 108 over a predetermined time period, and only cause the load 104 to operate in the alternate mode when it has counted a great enough number of voltage dips occurring within this time period. To keep track of time, the controller 112 preferably relies upon a timer 114 that is otherwise optional. The timer 114 may be part of the system 100 itself that is normally present, such as in the case where the system 100 includes facsimile capability and thus normally includes a timer. The timer 114 may also be part of the controller 112, or may be present within the system 100 only for use by the controller 112. The timer 114 may be a time clock, or another type of timer.

Therefore, when the detector 108 first detects a dip in the voltage being supplied by the power supply 102 to the load 104, the controller 112 in this embodiment sets the start time for the predetermined time period by utilizing the timer 114. When the detector 108 detects additional dips, the controller 112 examines the current time supplied by the timer 114 to determine whether the predetermined time period has been exceeded. If the time period has been exceeded, and the detector 108 has not detected enough dips to cause the controller 112 to have the load 104 operate in the alternate mode, then the controller 112 starts recounting the number of dips, and restarts the time period by resetting the start time as the current time. Other manners by which the controller 112 can utilize the timer 114 to determine whether the detector 108 detects the requisite number of dips within the predetermined time period are also amenable to embodiments of the invention.

FIG. 2 shows a graph 200 of the voltage 212 provided by the power supply 102 to the detector 104 as it fluctuates over time, as an illustrative example only, according to an embodiment of the invention. Thus, the x-axis 202 measures time, whereas the y-axis 204 indicates measures the voltage level that the power supply 102 supplies to the detector 102. Three levels of voltage are particularly highlighted on the y-axis 204: a nominal level 206, a threshold level 208, and a reset level 210. Preferably the power supply 102 normally provides the voltage 212 to the detector 102 at the nominal level 206.

However, as a result of fluctuations in the voltage provided by the external power source 110 to the power supply 102, and/or as a result of the peak power being consumed by the load 104, the voltage 212 may drop. If the voltage 212 drops below the threshold level 208, then the detector 108 considers a voltage dip to have occurred. The voltage 212 may further drop below the reset level 210. The reset level 210 is the level of voltage below which the system 100 cannot properly operate, and thus resets itself, similar to as if the system 100 had been turned on and off. Having the load 104 operate in the alternate mode preferably reduces the likelihood that the voltage 212 will drop below the reset level 210 to cause the system 100 to reset.

Therefore, the voltage dips that drop below the threshold level 208, but not below the reset level 210, are considered warnings that the voltage 212 supplied by the power supply 102 to the load 104 may result in a voltage dip below the reset level 210. The detector 108 detects and the controller 112 counts these voltage dips, or warnings, and if a sufficiently large number are counted, optionally within a given period of time, then the controller 112 causes the load 104 to operate in the alternate mode to mitigate against the voltage 212 from dropping below the reset level 210.

The dip 214 shown in FIG. 2 is an example of the voltage 212 dropping below the threshold level 208 for a duration 216, such that the detector 108 detects a voltage dip as having occurred. Similarly, the transient 218 is an example of the voltage 212 dropping below the threshold level 208 for a duration 220, such that the detector 108 also detects a voltage dip as having occurred. Where the voltage 212 does not drop below the threshold level 208, the detector 108 does not detect a voltage dip as having occurred. Finally, the reset 222 is an example of the voltage 212 dropping below the reset level 210, causing the system 100 to reset.

FIG. 3 shows the system 100 according to another embodiment of the invention. The system 100 of the embodiment of FIG. 3 is more detailed than, but is consistent with, that of the embodiment of FIG. 1 that has been described. In particular, the mechanism 116 is shown in more detail as including a flag 302 and a counter 304. When the detector 108 detects a voltage dip occurring in the voltage supplied by the power supply 102 to the load 104, it sets a flag 302, which may be a memory location of the system 100. The controller 112 periodically polls the flag 302. When it has determined that the flag 302 has been set, it increases the counter 304, and resets the flag 302. The counter 304 may also be a memory location of the system 100. When the counter 304 exceeds a predetermined threshold number of times, the controller 112 causes the load 104 to operate in the alternate mode (viz., the reduced peak power state).

In an embodiment where the timer 114 is present, and where the load 104 is to operate in the alternate mode only where the detector 108 has detected the requisite number of voltage dips within a predetermined time period, the controller 112 performs further functionality relative to the counter 304. When it determines that the flag 302 has been set, if the counter 304 is currently zero, then the controller 112 may record the start time as a current time supplied by the timer 114, in addition to incrementing the counter 304 to one and resetting the flag 302. Thereafter, each time the controller 112 determines that the flag 302 has been set, it also checks the current time supplied by the timer 114, and determines whether it has exceeded the start time by the predetermined time period. If so, then the controller 112 resets the counter 304.

FIG. 4 shows an example implementation of the detector 108 of the system 100 of FIGS. 1 and 3, according to an embodiment of the invention. The detector 108 is implemented as a circuit in the embodiment of FIG. 4. The voltage 212 is that which is supplied by the power supply 102 to the load 104 and which is monitored by the detector 108 of the mechanism 116. It connects to ground through resistors 404 and 406. A capacitor 402 is connected in parallel with the resistor 406 to ground. Below the resistor 404 a resistor 410 connects to a base 418 of a transistor 412. The reference voltage 408 is connected to the source (or emitter) of the transistor 412, whereas a resistor 414 connects the collector (or drain) of the transistor 412 to ground. The collector of the transistor connects preferably to both inputs of an AND gate 416 to isolate and regulate an output 420.

In normal operation, when the voltage 212 that the power supply 102 provides to the load 104 is at the nominal level 206 of FIG. 2, or otherwise is greater than the threshold level 208 of FIG. 2, the voltage 212 acts to charge the capacitor 402. However, when the voltage 212 drops below the threshold level 208 of FIG. 2, the voltage stored in the capacitor 402 serves to turn on the transistor 412, causing current to flow from the reference voltage 408, through the transistor 412 and the resistor 414, and to ground. Thus, the voltage level at the inputs of the AND gate 416 is high, causing the output 420 to be high. This output 420 may be directly connected to the flag 302 of FIG. 3, such that the flag 302 is then set, indicating that the detector 108 has detected the occurrence of a voltage dip.

Methods

FIG. 5 shows a method 500 according to an embodiment of the invention. At least some parts of the method 500 may be implemented as a computer program stored on a computer-readable medium, such as firmware, for execution by a processor. The method 500 may be performed by the system 100 of FIG. 1 or the system 300 of FIG. 3 that have been described, although the invention is not so limited.

First, voltage is provided to a load (502), such as by the power supply 102 of FIGS. 1 and/or 3 to the load 104 of FIGS. 1 and/or 3. The voltage is capable of fluctuating between a level greater than a predetermined threshold level and a level less than the predetermined threshold level. A voltage dip in the level of this voltage, below the predetermined threshold level, is then detected (504). For instance, the detector 108 of FIGS. 1 and/or 3 of the mechanism 116 of FIGS. 1 and/or 3 may detect this voltage dip.

If the number of voltage dips detected is greater than a predetermined number of times (506), then the load operates in a reduced peak power state (508). Otherwise, voltage continues to be provided to the load (502), and so on. For instance, the controller 112 of FIGS. 1 and/or 3 may track the number of voltage dips that occur, and cause the load 104 to operate in the reduced peak power state when the predetermined number of times has been exceeded. The controller 112 may also more specifically determine in 506 of the method 500 whether the requisite number of voltage dips has occurred within a predetermined time period.

FIG. 6 shows the method 500 according to another embodiment of the invention. The method 500 of the embodiment of FIG. 6 is more detailed than, but consistent with, that of the embodiment of FIG. 5. However, at least some parts of the method 500 of the embodiment of FIG. 6 may still be implemented as a computer program stored on a computer-readable medium for execution by a processor. The method 500 of the embodiment of FIG. 6 may also be performed by the system 300 of FIG. 3 that has been described, although the invention is not so limited.

First, a counter is reset (602), and a flag is reset (604). The counter and the flag may be the counter 304 of FIG. 3 and the flag 302 of FIG. 3, respectively. The flag is preferably set when a voltage dip is detected—that is, when the voltage supplied by a power supply to a load drops below a predetermined threshold level. The counter tracks the number of times the flag has been set, and thus the number of voltage dips that have been detected.

Voltage is supplied by a power supply to a load (502), such as by the power supply 102 of FIG. 3 to the load 104 of FIG. 3, and a voltage dip is detected (504), such as by the detector 108 of FIG. 3. In response, the flag is set (606), such as by the detector 108. That the flag is set is then detected (608). For instance, the controller 112 of FIG. 3 may periodically poll the flag, and detect that the flag has been set.

In response, the method 500 of the embodiment of FIG. 6 can first optionally perform time-related functionality 610. The time-related functionality 610 is preferably performed where the load is to operate in a reduced peak power state when a requisite number of voltage dips are detected within a predetermined time period. The time-related functionality 610 is preferably not performed where the load is to operate in the reduced peak power state when a requisite number of dips are detected, without regard for the time period in which the dips occur. The time-related functionality 610 may be performed by the controller 112, utilizing the timer 114 of FIG. 3.

Where the time-related functionality 610 is performed, if the counter is zero (612), then a start time is set as the current time (614). If the counter is not zero (612), and if the current time compared to the previously set start time exceeds the predetermined threshold time period (616), then the counter is reset (618), and a new start time is set as the current time (614). Where the start time has been most recently been set (614), or where the current time compared to the previously set start time does not exceed the predetermined threshold time period (616), then performance of the time-related functionality 610 is finished.

Once the time-related functionality 610 is performed, or where the time-related functionality 610 is not to be performed, the counter is incremented (620), such as by the controller 112. If the counter exceeds the predetermined threshold number of times (506), then this means that the number of voltage dips detected has exceeded the threshold number, and the load operates in the reduced peak power state (508). For example, the controller 112 may cause the load 104 to operate in this state. If the counter does not exceed the predetermined threshold number of times (506), then the flag is reset (604), voltage continues to be provided to the load (502), and so on.

Image-Forming Device

FIG. 7 shows an image-forming device 100' according to an embodiment of the invention. The image-forming device 100' is a particular embodiment of the system 100 of FIGS. 1 and/or 3. As such, the image-forming device 100' includes a power supply 102 connected to an external power source 110, and a detecting and controlling mechanism 116, as have been described. The load 104 of the system 100 of FIGS. 1 and/or 3, however, is more specifically an image-forming mechanism 104' within the image-forming device 100' of the embodiment of FIG. 7.

The image-forming mechanism 104' forms an image on media. It may be an inkjet-printing mechanism, a laser-printing mechanism, or another type of mechanism. Thus, the image-forming device 100' may be an inkjet printer, a laser printer, or another type of device, such as a multifunction device (MFD) that includes inkjet-printing or laser-printing capability, and so on. The image-forming mechanism 104' is operable in a default mode and an alternate mode, or reduced peak power state, as has been described in relation to the generic load 104 of the system 100 of FIGS. 1 and/or 3. The image-forming mechanism 104' may include a heater to fuse toner onto the media, in the case of an laser-printing mechanism, a motor attached to a roller to move the media through the device 100', in the case of an inkjet-printing mechanism, and so on.

Thus, the detecting and controlling mechanism 116 detects and counts the number of times the voltage the power supply 102 provides to the image-forming mechanism 104' drops below a predetermined threshold level. When this number of voltage dips exceeds a predetermined threshold number of times, the detecting and controlling mechanism 116 causes the image-forming mechanism 104' to operate in its alternate mode. Alternatively, the detecting and controlling mechanism 116 may also track time, such that it causes the image-forming mechanism 104' to operate in the alternate mode only when the requisite number of voltage dips occurs during a predetermined time period.

Conclusion

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. For instance, whereas embodiments of the invention are substantially described in relation to a system having a load, it is applicable to all such systems, including but not limited to image-forming devices like printers, facsimile machines, multifunction devices, and so on. Therefore, it is manifestly intended that this invention be limited only by the claims and equivalents thereof.

I claim:

1. A power supply for a load comprising:
a connector to connect to an external power source;
a converter to convert voltage provided by the external power source to voltage for use by the load; and,
a detector to detect when the voltage for use by the load drops below a predetermined threshold level, the load operating in a reduced peak power state when the detector detects the voltage for use by the load dropping below the predetermined threshold level more than a predetermined threshold number of times.

2. The power supply of claim 1, wherein the connector is to connect to an external alternating current (AC) power source.

3. The power supply of claim 1, wherein the connector is to connect to an external direct current (DC) power source.

4. The power supply of claim 1, wherein the converter comprises a transformer.

5. The power supply of claim 1, wherein the detector sets a flag when the voltage for use by the load drops below the predetermined threshold level.

6. The power supply of claim 1, wherein the detector notifies a controller when the voltage for use by the load drops below the predetermined threshold level.

7. The power supply of claim 1, wherein the load operates in the reduced peak power state when the detector detects the voltage for use by the load dropping below the predetermined threshold level more than the predetermined threshold number of times within a predetermined time period.

8. A computer-readable medium having a computer program stored thereon to perform a method comprising:
resetting a counter and a flag, the flag being set in response to voltage dropping below a predetermined threshold level;
in response to detecting the flag being set, incrementing the counter and resetting the flag; and,
in response to the counter exceeding a predetermined number of times, causing the load to operate in a reduced peak power state.

9. The medium of claim 8, the method further comprising:
tracking a start time when incrementing the counter from zero to one; and,
resetting the counter to zero when a current time is past the start time by a predetermined time period.

10. An image-forming device comprising:
a first mechanism to form an image on media and operable in a default mode and an alternate mode, the first mechanism having better performance in the default mode than in the alternate mode and consuming less peak power in the alternate mode than in the default mode;
a power supply connectable to an external power source to provide voltage to at least the first mechanism; and,
a second mechanism to cause the first mechanism to operate in the alternate mode upon detecting the voltage provided by the power supply dropping below a predetermined threshold level more than a predetermined threshold number of times.

11. The image-forming device of claim 10, wherein the first mechanism is an inkjet mechanism including a motor to move the media through the image-forming device.

12. The image-forming device of claim 10, wherein the first mechanism is a laser mechanism including a heater to fuse toner onto the media.

13. The image-forming device of claim 10, wherein the second mechanism causes the first mechanism to operate in the alternate mode upon detecting the voltage provided by the power supply dropping below the predetermined threshold level more than the predetermined threshold number of times within a predetermined time period.

* * * * *